United States Patent [19]
Gargiulo et al.

[11] Patent Number: 5,749,078
[45] Date of Patent: May 5, 1998

[54] METHOD AND APPARATUS FOR STORAGE OF ACCOUNTING INFORMATION IN A VALUE DISPENSING SYSTEM

[75] Inventors: Joseph L. Gargiulo, Trumbull; Walter J. Baker, Stratford; Richard W. Heiden, Shelton, all of Conn.

[73] Assignee: Pitney Bowes Inc., Stamford, Conn.

[21] Appl. No.: 709,190

[22] Filed: Aug. 23, 1996

[51] Int. Cl.$^6$ ........................................ G07B 17/00
[52] U.S. Cl. ........................ 705/404; 364/400; 705/30; 705/401
[58] Field of Search ................... 235/375, 380, 235/381; 364/400, 464.11, 464.14, 464.15, 464.18, 464.2, 464.22; 371/31; 380/23, 25, 51; 395/182.13, 230

[56] References Cited

U.S. PATENT DOCUMENTS

| | | | |
|---|---|---|---|
| 4,097,923 | 6/1978 | Eckert, Jr. et al. | 364/464.13 |
| 4,306,299 | 12/1981 | Check | 364/900 |
| 4,377,214 | 3/1983 | Hansen et al. | 364/464.21 X |
| 4,445,198 | 4/1984 | Eckert | 364/900 |
| 4,566,106 | 1/1986 | Check | 371/67 |
| 4,725,718 | 2/1988 | Sansone et al. | 235/495 |
| 4,743,747 | 5/1988 | Fougere et al. | 380/51 X |
| 4,757,537 | 7/1988 | Edelman et al. | 380/51 |
| 4,775,246 | 10/1988 | Edelman et al. | 380/23 |
| 4,802,117 | 1/1989 | Chrosny et al. | 364/464.15 X |
| 4,802,218 | 1/1989 | Wright et al. | 380/23 |
| 4,805,109 | 2/1989 | Kroll | 364/464.02 |
| 4,809,185 | 2/1989 | Talmadge | 364/464.02 |
| 4,831,555 | 5/1989 | Sansone et al. | 395/113 |
| 4,845,632 | 7/1989 | Kroll | 364/464.02 |
| 4,873,645 | 10/1989 | Hunter et al. | 364/479.01 |
| 4,916,623 | 4/1990 | Check | 364/464.02 |
| 4,980,542 | 12/1990 | Jackson | 235/375 |
| 5,021,963 | 6/1991 | Brown et al. | 364/464.15 |
| 5,029,093 | 7/1991 | Wiener | 364/464.02 |
| 5,109,152 | 4/1992 | Takagi et al. | 235/380 |
| 5,109,507 | 4/1992 | Check | 395/575 |
| 5,111,030 | 5/1992 | Brasington | 235/375 |
| 5,124,926 | 6/1992 | Barns-Slavin et al. | 364/464.17 |
| 5,185,798 | 2/1993 | Hamada | 380/23 |
| 5,195,133 | 3/1993 | Kapp et al. | 235/380 X |
| 5,619,574 | 4/1997 | Johnson et al. | 395/117 |
| 5,625,694 | 4/1997 | Lee et al. | 380/23 |
| 5,651,103 | 7/1997 | Arsenault et al. | 380/25 |

*Primary Examiner*—Edward R. Cosimano
*Attorney, Agent, or Firm*—Angelo N. Chaclas; Melvin J. Scolnick

[57] ABSTRACT

A value dispensing system comprising a portable data carrier and a terminal. The portable data carrier including a memory having stored therein accounting information indicative of an amount of value available for dispensing. The terminal including a memory and means for dispensing value and adapted to receive the portable data carrier and process a transaction which dispenses a given value in response to a digital token generated by the portable data carrier using a first cryptographic key. For the value dispensed, the postage evidencing system creates a transaction record having a secret portion which is indicative of the amount of value available for dispensing on the portable data carrier wherein the secret portion of the transaction record is encrypted using a second cryptographic key derived from the first cryptographic key, and the transaction record is stored in the terminal memory.

13 Claims, 2 Drawing Sheets

METHOD AND APPARATUS FOR STORAGE OF ACCOUNTING INFORMATION IN A VALUE DISPENSING SYSTEM

CROSS REFERENCE TO RELATED APPLICATIONS

This application is related to U.S. patent application Ser. Co./No. 08/574,743; filed on Dec. 19,1995, and entitled SYSTEM AND METHOD FOR DISASTER RECOVERY IN AN OPEN METERING SYSTEM (E-420) and copending U.S. patent application Ser. Co./No. 081518,442; filed on Aug. 23,1995, and entitled METHOD FOR REMOTELY INSPECTING A POSTAGE METER (E-401) now issued as U.S. Pat. No. 5,638,442.

FIELD OF THE INVENTION

This invention relates to value dispensing systems. More particularly, this invention is directed to a value printing or postage evidencing system comprising a secure accounting vault having accounting information stored therein and a memory external to the secure accounting vault where the accounting information is stored.

BACKGROUND OF THE INVENTION

One example of a value printing system is a postage meter. Electronic postage meters for dispensing postage and accounting for the amount of postage used are well known in the art. The meter supplies evidence of the postage dispensed by printing indicia which indicates the value of the postage on an envelope or the like. The typical postage meter stores accounting information concerning its usage in a variety of registers. An ascending register tracks the total amount of postage dispensed by the meter over its lifetime. That is, the ascending register is incremented by the amount of postage dispensed after each transaction. A descending register tracks the amount of postage available for use. Thus, the descending register is decremented by the amount of postage dispensed after each transaction. When the descending register has been decremented to some value insufficient for dispensing postage, then the postage meter inhibits further printing of indicia until the descending register is resupplied with funds.

It is well known to store accounting information redundantly in postage meters to ensure the security and accuracy of the information. Examples of such systems are found in U.S. Pat. No. 4,566,106, entitled ELECTRONIC POSTAGE METER HAVING REDUNDANT MEMORY, U.S. Pat. No. 4,916,623, entitled ELECTRONIC POSTAGE METER HAVING REDUNDANT MEMORY, U.S. Pat. No. 5,109,507, entitled ELECTRONIC POSTAGE METER HAVING REDUNDANT MEMORY, U.S. Pat. No. 5,029,093, entitled DUAL REDUNDANT ELECTRONIC POSTAGE METER, and U.S. Pat. No. 4,809,185, entitled SECURE METERING DEVICE STORAGE VAULT FOR A VALUE PRINTING SYSTEM. Typically, the information is stored in separate memory units located within the same secure accounting vault. In this manner, if one memory unit should fail, then the information from the other memory unit will allow the postage meter to continue to operate. Thus, the reliability of the postage meter is increased and customers are less likely to suffer a loss of postal funds.

Although the above systems generally work well, a problem arises when it is desired to physically separate the secure accounting vault from the remainder of the postage meter housing. For instance, it is desirable to provide the accounting vault on a portable data carrier such as a smart card, magnetic strip card or the like. In this manner, the postage meter housing is adapted to receive the portable data carrier when inserted by a user and the accounting registers on the portable data carrier are updated when postage is dispensed. Thus, the postage meter housing merely becomes a printer device with no accounting capability of its own.

The problem that arises is that the accounting vault located in the portable data carrier is subjected to greater electrical, thermal and mechanical stresses than when the accounting vault is located in the postage meter housing. The postage meter housing provides a controlled environment where precautions can be taken to protect the accounting vault. On the other hand, the portable data carrier is not in a controlled environment. It may be bent while stored in someone's wallet or purse, experience severe thermal cycling if left in someone's car, or be subjected to high levels of electromagnetic interference if left on top of a television set or a microwave oven. Thus, the portable data carrier is subjected to a wide and unpredictable number of hostile environments which may cause the internal memory where the accounting information is stored to fail. For these reasons, it is likely that if one memory unit in the portable data carrier fails, then any remaining memory units are also likely to have failed.

Therefore, redundant storage of accounting information in separate memory units within the portable data carrier will not provide adequate assurance against the loss of postal funds. Thus, there are not adequate assurances that the accounting information can be retrieved in the event of a damaged portable data carrier. This is likely to lead to disputes between the portable data carrier owners and the portable data carrier issuing authority. On one hand, if the issuing authority makes good on all the claims for lost funds due to damaged portable data carriers, then the issuing authority is susceptible to fraud and financial losses. On the other hand, if the issuing authority does not honor the claims, then the owners with legitimate claims will become dissatisfied with the issuing authority. Neither scenario is desirable.

In U.S. patent application Ser. Co./No. 08/574,743; filed on Dec. 19,1995, and entitled SYSTEM AND METHOD FOR DISASTER RECOVERY IN AN OPEN METERING SYSTEM, a system is disclosed where accounting information is stored on a portable data carrier and also redundantly stored in a secure fashion on a personal computer hard drive which is in operative communication with the portable data carrier. Each time postage is dispensed, a transaction record is created which is encrypted and stored on the hard drive. Although this system allows for the recovery of postal funds information from the transaction records on the hard drive so that a credit can be issued for damaged portable data carriers, it suffers from other deficiencies.

It is well known in the art to use digital tokens to print postage on a nonsecure printer. Generally, the postage value for a mailpiece is encrypted together with other data to generate a digital token which is then used to generate a postal indicia that is printed on the mailpiece. Without receipt of an authentic digital token, the printer will not print postal indicia. To prevent others from fraudulently generating digital tokens, the postage evidencing system employs a set of secret cryptographic keys which are used during the encryption process to create digital tokens and authenticate the digital tokens that are received. In this manner, postal funds are dispensed securely. Examples of such systems are described in U.S. Pat. Nos. 4,757,537, 4,831,555, 4,775,246, 4,873,645 and 4,725,718, the entire disclosures of which are specifically incorporated herewith by reference.

In U.S. patent application Ser. Co./No. 08/574,743, discussed above, the same cryptographic keys which are used to generate the digital tokens are used to generate the secure transaction records. Thus, since the transaction records are stored on an unsecure device, they are susceptible to interrogation by others. On the other hand, the digital tokens are not generally subject to interrogation. It is possible that one skilled in the art could reverse engineer the encryption process using the transaction records and discover the secret cryptographic key used to create the transaction records and the digital tokens. Thus, gaining unauthorized access to the secret keys would allow someone to create their own digital tokens fraudulently. Because these fraudulent digital tokens would be created with the secret keys, the postage evidencing system would not be able to distinguish them from valid digital tokens and the system would be compromised.

Therefore, there is a need for a postage evidencing system comprising an accounting vault located on a portable data carrier that is less susceptible to the loss of postal funds because of damage to the portable data carrier. Also, there is a need postage evidencing system comprising an accounting vault located on a portable data carrier and redundant storage of accounting information which does not compromise the cryptographic keys associated with printing value.

SUMMARY OF THE INVENTION

Accordingly, it is an object of the present invention to provide a postage evidencing system with improved reliability and which substantially overcomes the problems associated with the prior art.

In accomplishing this and other objects there is provided a value dispensing system comprising a portable data carrier and a terminal. The portable data carrier including a memory having stored therein accounting information indicative of an amount of value available for dispensing. The terminal including a memory and means for dispensing value and adapted to receive the portable data carrier and process a transaction which dispenses a given value in response to a digital token generated by the portable data carrier using a first cryptographic key. For the value dispensed, the postage evidencing system creates a transaction record having a secret portion which is indicative of the amount of value available for dispensing on the portable data carrier wherein the secret portion of the transaction record is encrypted using a second cryptographic key derived from the first cryptographic key, and the transaction record is stored in the terminal memory.

In accomplishing this and other objects there is provided a method of storing accounting information in a value dispensing system including a portable data carrier and a terminal. The terminal including a memory and means for dispensing value and adapted to receive the portable data carrier. The portable data carrier including a memory having stored therein accounting information indicative of an amount of value available for dispensing. The method comprising the steps of: (a) generating a digital token indicative of a given using a first cryptographic key; (b) dispensing the given value; (c) generating a second cryptographic key derived from the first cryptographic key; (d) creating a transaction record having a secret portion using the second cryptographic key which is indicative of the amount of value available for dispensing on the portable data carrier; and (e) storing the transaction record in the terminal memory.

Therefore, it is now apparent that the invention substantially achieves all the above objects and advantages. Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention. As shown through out the drawings, like reference numerals designate like or corresponding parts.

DETAILED DESCRIPTION OF THE PREFERRED EMBODIMENTS

Figure 1:
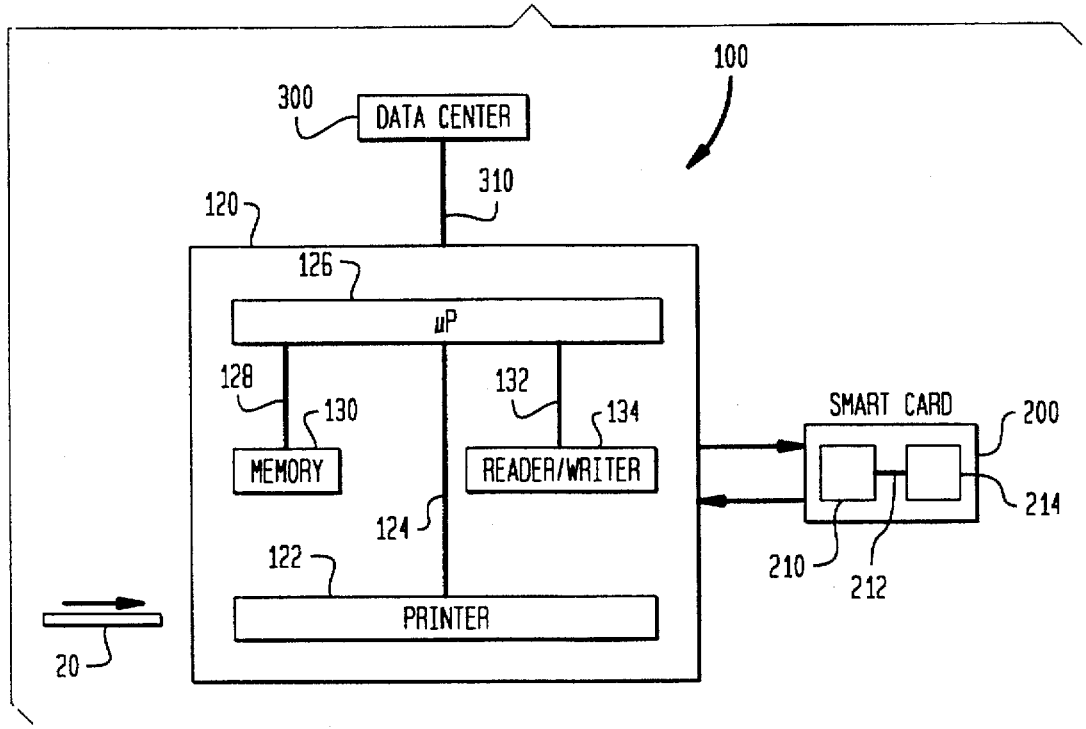
FIG. 1 is a schematic representation of a postage evidencing system in accordance with a first embodiment of the invention.

Referring to FIG. 1, a postage evidencing system 100 in accordance with a first embodiment of the invention is shown. The postage evidencing system 100 includes a postage evidencing device 120, a smart card 200 and a postal authority or a data center 300. The postage evidencing device 120 is adapted to accept the smart card 200 and is in communication with the data center 300 via a conventional telephone line 310. The data center 300 is operated by a postal authority or other designated authority.

The smart card 200 includes a microprocessor 210 in communication over line 212 with memory 214 and associated software necessary to perform the accounting functions of the postage evidencing system 100. The memory 214 stores accounting information including the value of an ascending register which represents the lifetime amount of postage dispensed and the value of a descending register which represents the amount of funds available for postage. While resident in the postage evidencing device 120, the smart card 200 can be recharged with funds in a conventional manner by means of the postage evidencing device 120 linking up to the data center 300 over telephone line 310. This technique is described in more detail in U.S. Pat. No. 4,809,185, entitled SECURE METERING DEVICE STORAGE VAULT FOR A VALUE PRINTING SYSTEM, and U.S. Pat. No. 4,097,923, entitled REMOTE POSTAGE METER CHARGING SYSTEM USING AN ADVANCED MICROCOMPUTERIZED POSTAGE METER, both of which are specifically incorporated herein by reference.

The postage evidencing device 120 includes a microprocessor 126 in operative communication with: a print module 122, a memory 130 and a card reader/writer 134 over conventional communication lines 124, 128 and 132, respectively. The card reader/writer 134 is adapted to receive the smart card 200 and serves as the interface between the postage evidencing device 120 and the smart card 200 allowing them to be in bidirectional communication. The print module 122 includes a microprocessor (not shown) and adequate structure (not shown) to print postal indicia (a mark representing postage) on an envelope 20. A more detailed description of a postage evidencing device where the portable data carrier is dedicated to the printer and not removable by the user is provided in U.S. patent application Ser. No. 08/554,179, filed on Nov. 6, 1995, entitled MAIL HANDLING APPARATUS AND PROCESS FOR PRINTING AN IMAGE COLUMN-BY-COLUMN IN REAL TIME (E-394) now U.S. Pat. No. 5,651,103, which is specifically incorporated herein by reference. A more detailed description of a postage evidencing device where the portable data carrier is not dedicated to the printer is provided in U.S. patent application Ser. Co./No. 08/574,743; filed on Dec. 19,1995, and entitled SYSTEM AND METHOD FOR DISASTER RECOVERY IN AN OPEN METERING SYSTEM (E-420), which is specifically incorporated herein by reference.

The microprocessor 126, the print module 122 and the smart card 200 work in cooperation to track the amount of postage used. When the smart card 200 is inserted into the postage evidencing device 120, a secure handshake recognition procedure takes place between the smart card microprocessor 210 and a microprocessor in the postage evidencing device 210, preferably the print module microprocessor (not shown). Generally, a secret key is stored in the smart card 200 and a corresponding secret key is stored in the postage evidencing device 120. Both the smart card 200 and the postage evidencing device 120 employ an encryption algorithm, such as DES, for use with the secret keys to create (encrypt) and decipher (decrypt) secret messages. Unless the smart card is validated by the postage evidencing device 120 and the postage evidencing device is validated by the smart card 200, the postage evidencing device 120 will not print postage indicia. Generally, the smart card 200 creates and sends a digital token to the postage evidencing device 120 so that postal indicia can be printed. Without these tokens which are created using the secret key, the postage evidencing device 120 will not dispense postage. Since various suitable handshake recognition procedures are well known in the art, it is only referred to here so as to provided background information and does not constitute a part of the invention. A detailed description of a suitable handshake and token generation procedure is provided in U.S. patent application Ser. Co./No. 08/575,107; filed on Dec. 19, 1995, and entitled TOKEN GENERATION PROCESS IN AN OPEN METERING SYSTEM (E-416) and U.S. patent application Ser. No. 08/518,442, filed on Aug. 23, 1995, entitled METHOD FOR REMOTELY INSPECTING A POSTAGE METER (E-401) now issued as U.S. Pat. No. 5,638,442, both of which are specifically incorporated herein by reference.

After the handshake recognition procedure has validated the smart card 200 and the postage evidencing device 120, postage indicia can be printed. Once a request to print postal indicia is made, the smart card microprocessor 210 checks memory 214 to see if the descending register indicates that sufficient funds are available. If so, then a postage dispensing transaction occurs. Thus, the smart card microprocessor 210 needs to debit the appropriate amount from the descending register, add the same amount to the ascending register and send the postage to the print module 122 via the postage evidencing device microprocessor 126. In a similar manner, when postal funds are added to the smart card 200 during a recharge, the amount of the funds are added to the descending register. A more detailed description of a postage transaction system employing smart cards is described in U.S. Pat. No. 4,802,218, entitled AUTOMATED TRANSACTION SYSTEM USING MICROPROCESSOR CARDS, which is specifically incorporated herein by reference.

Figure 2:
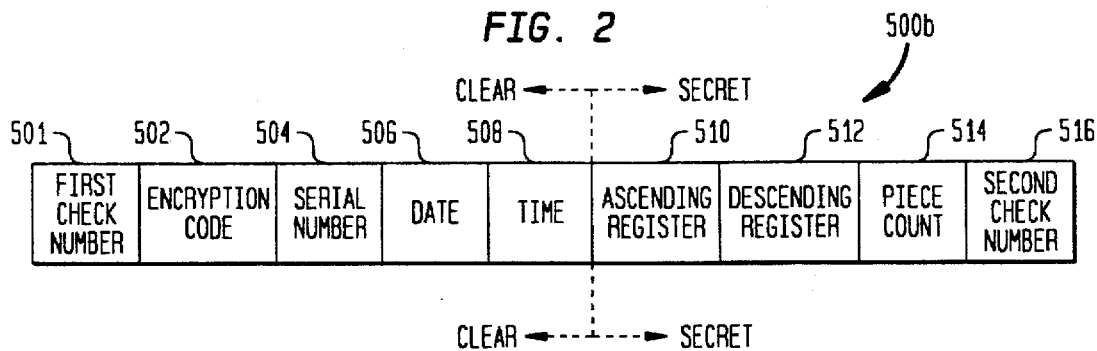
FIG. 2 is a schematic representation of a transaction record stored in a postage evidencing device.

With the structure of the postage evidencing system 100 defined as above, the structure of the accounting information will now be described. It is important to note that both dispensing postage and recharging postage create transactions which need to be recorded. Referring to FIG. 2, a transaction record 500b representing a preferred embodiment of the accounting information and other data which is stored in the postage evidencing device 120 is shown. The record 500b includes a first check number 501, an encryption code 502, a smart card serial number (sometimes referred to as a vault ID) 504, the transaction date 506, the transaction time 508, the value of the ascending register 510, the value of the descending register 512, a piece count 514 and a second check number 516. The first check number 501, encryption code 502, smart card serial number 504, transaction date 506 and transaction time 508 are not encrypted. That is, this information is clearly discernible and not in any secret format. On the other hand, the information which is susceptible to tampering and fraud, the value of the ascending register 510 and the value of the descending register 512, as well as the piece count 514 and the second check number 516 is encrypted into a secret format. Thus, the record 500b includes a clear portion and a secret portion.

Each element of the record 500b which has not previously been described will now be defined. The encryption code 502 provides information describing the encryption technique used to generate the secret portion of the record 500b. Thus, the data center 300 will know how the transaction record 500b was created and correspondingly how the secret portion of the record 500b should be decrypted. The smart card serial number 504 is a unique identifier assigned to every smart card 200 issued by the data center 300. The piece count 514 is an indicator of how many postal indicia have been printed by the postage evidencing device 120 over a given time period. The first check number 501 and the second check number 516 are used by the data center 300 to verify that the decryption has been performed successfully. A more detailed description of this appears below.

As described above, for each transaction, the accounting information stored in the smart card 200 is also updated. Additionally, the record 500b is stored in the memory 130 located in the postage evidencing device 120. In this manner, the accounting information is redundantly stored external to the smart card 200 and is not susceptible to the same risk of loss as the accounting information located in smart card memory 214. Therefore, if the smart card 200 becomes damaged, the data center 300 can interrogate the record 500b stored in the postage evidencing device memory 130 to determine the amount of postal funds that were on the damaged smart card and issue a credit, such as a new smart card. The data center 300 can obtain access to the record 500b by accessing the postage evidencing device memory 130 via the telephone line 310, or by having the card owner bring the postage evidencing device 120 to the data center 300 or other suitable location.

Figure 2A:
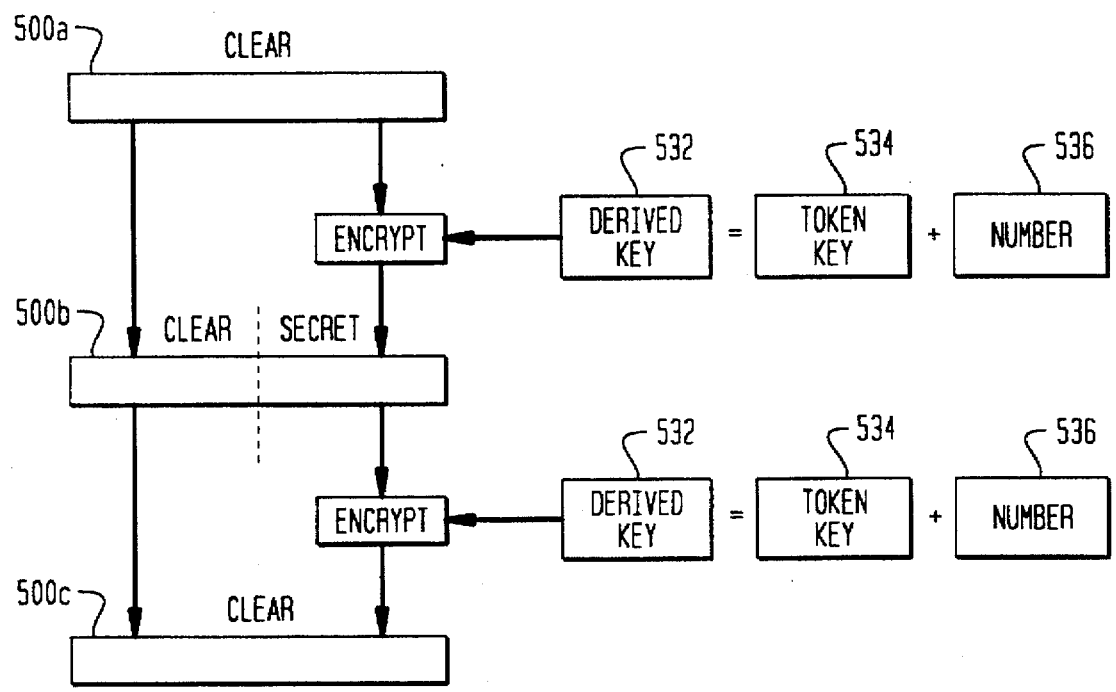
FIG. 2A is a flow chart showing how the transaction record is created and subsequently used by an issuing authority.

Referring to FIG. 2A, a flow chart showing how the transaction record 500b is created and subsequently used by the data center 300 is shown. Preliminary data 500a is created and/or assembled by the postage dispensing system 100, either in the smart card microprocessor 210 or other processor, which contains all of the elements necessary to assemble record 500b. At this stage, data 500a is clear (not in any secret format). Using a token key 534 and a number 536, a new key 532 is derived. A wide variety of techniques exist to derive a new key from an existing key. For example, a circular shift of the bytes of the existing key, then XOR-ing the result with the number 536 would yield a suitable new key based upon the existing key. As another example, selected bytes of the existing number could be XOR-ed and then XOR-ing the result with the number 536. Thus, it is apparent that many derivation techniques would be readily apparent to those skilled in the art.

The derived key is then used to encrypt a portion of the data 500a into a secret format. In the preferred embodiment, the number 536 should be a variable or nonfixed number. A variety of numbers already exist in the system 100 which would be suitable for this purpose, such as the transaction date, time, piece count, serial number 504 or some combination of these. The only requirement is that the number is stored in the clear portion of the record 500b for later use by the data center 300. The record 500b is then stored in memory 130. Then, when a card owner presents a damaged smart card 200 to the data center 300 for credit of unused postal funds, the data center 300 retrieves the records 500b from memory 130 and decrypts them into data 500c. Since the data center 300 knows: (1) the token key 534, (2) the particular encryption technique used via the encryption code 502, and (3) the number 536 by selecting the appropriate portion of the clear portion of the record 500b, the data center 300 can decrypt the secret portion of the record 500b and determine the amount of unused postal funds for the damaged smart card 200. Thus, a new card, credit or refund can be issued to the card owner.

As an added measure of security, the data center 300 can use the first check number 501 and the second check number 516 to validate the decryption. Using these numbers, it can be determined whether or not the decryption has occurred successfully and whether or not the transaction record 500b has not been tampered with. The first check number 501 and the second check number 516 can be any number generated in any fashion. Since the first check number 501 is clear, it can easily be compared to the decrypted result of the second check number 516. If these numbers correspond, then the decryption was valid. If these numbers do not correspond, then either the decryption was invalid or the data contained in the record 500b has been tampered with. Those skilled in the art will recognize that the first check number 501 and the second check number 516 could be the serial number 504, date 506, time 508, descending register 510, ascending register 512, a randomly generated number or any other suitable number so long as it is stored in both the clear and the secret portion of the record 500b.

In the preferred embodiment, an additional layer of security can be added by having the first check number 501 and the second check number 516 not be identical numbers. Instead, the first check number 501 and the second check number 516 can have some predetermined relationship to each other which is not readily discernible at first inspection. For example, the first check number 501 can be a palindrome (mirror image or the like) of the second check number 516. In this manner, attempts to reverse engineer the record 500b by using the first check number 501 and the second check number 516 will be discouraged. Those skilled in the art will recognize that other schemes such as parity checks, check sum digits and number compliments could also be used to create a relationship between the first check number 501 and the second check number 516.

It should now be understood that the invention substantially increases the security with storing account information external to the smart card 200 without significantly burdening the system 100. Instead of storing a second set of cryptographic keys, the invention makes use of the token keys for adding security to the records 500b, but does so in a manner that reduces the risk that the token keys will be compromised.

Figure 3:
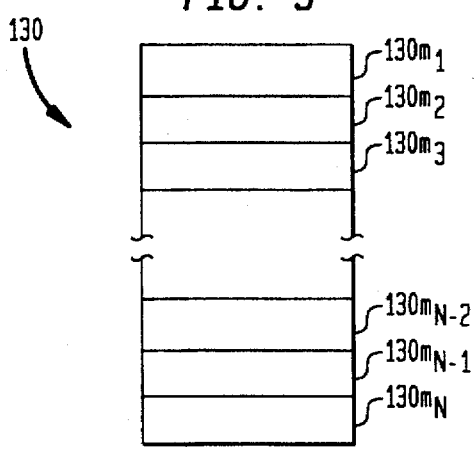
FIG. 3 is a schematic representation of a circular buffer type memory located in the postage evidencing device where a plurality of transaction records are stored.

In the preferred embodiment, the memory 130 is of a circular buffer type. Referring to FIG. 3, the memory 130 is shown having a sequence of memory addresses $130M_1$ through $130M_N$. Address $130M_1$ holds the most recent transaction record 500b while address $130M_2$ holds the next most recent transaction record 500b, and so on. Address $130M_N$ holds the oldest transaction record 500b that is retained by the system. In practice, when a new transaction occurs, the transaction record 500b is entered into address $130M_1$ and the previously existing records shift down by one position and the record 500b that was in address $130MN$ is eliminated. Thus, the number of records that the memory 130 can hold is N which is set to a predetermined number by specifying the size of the memory 130 and the size of the record 500b.

By utilizing the circular buffer, memory 130 not only provides redundant storage of the most recent accounting information but also provides a historical record. Thus, in a postage evidencing system 100 having a plurality of smart cards 200 capable of interfacing with the postage evidencing device 120, the most recent transactions for a plurality of different smart cards 200 are stored. For example, if a first smart card is used to complete one transaction and then a second smart card is used to complete two subsequent transactions, then the accounting information corresponding to the first smart card is stored in address $130M_3$ while the most recent transaction corresponding to the second smart card is stored in address $130M_1$. Thus, if these smart cards were damaged, then the records 500b stored in these respective addresses would be identified and used to issue credits.

Those skilled in the art will recognize that this invention has application beyond postage evidencing systems 100. Any system having a portable data carrier which holds value and is used in conjunction with another base or terminal to dispense that value would benefit from the invention. Examples of such systems are: prepaid calling cards for use in telephones, and prepaid debit cards for use by employees at a company store or cafeteria.

Those skilled in the art will also recognize that where the information is stored in the postage evidencing device 120 is merely a matter of design choice as is the type of memory used. Furthermore, the information stored in the postage evidencing device 120 and the smart card 200 need not be identical. All that is required is that the information stored in the postage evidencing device 120 has sufficient detail to distinguish between different smart cards 200 and determine their respective descending registers.

However, in a postage evidencing system having a dedicated smart card, such as one where the smart card is permanently mounted to the postage evidencing device and only accessible by designated authorities, then the smart card serial number need not be stored in the postage evidencing device.

Figure 4:
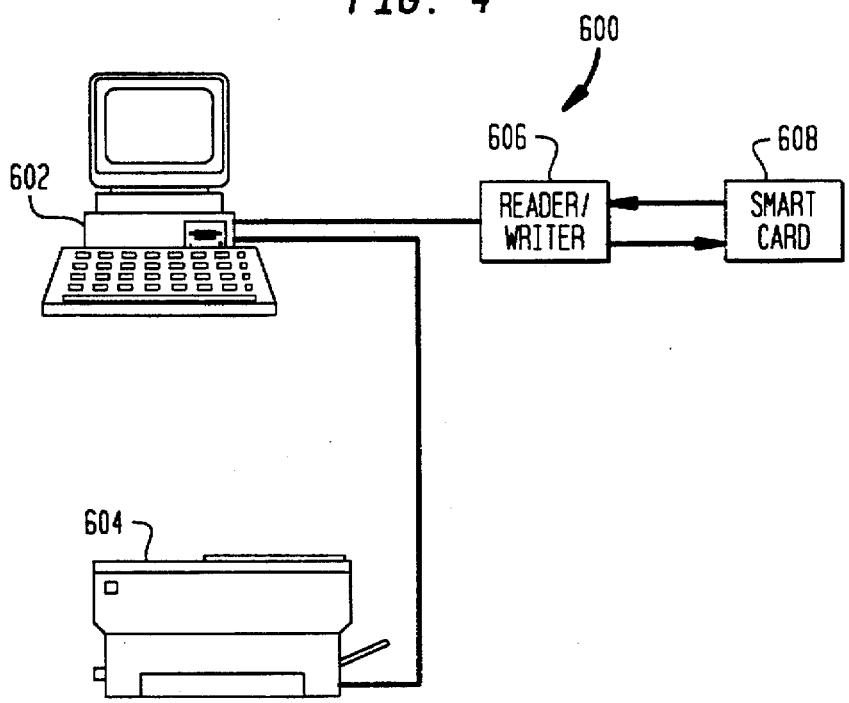
FIG. 4 is a schematic representation of a postage evidencing system n accordance with a second embodiment of the invention.

Referring to FIG. 4, a postage evidencing system 600 in accordance with a second embodiment of the present invention is shown. Those skilled in the art will recognize that the second embodiment logically flows from the first embodiment described above but with the substitution of slightly different components. The system includes a personal computer 602 of any suitable conventional design such as those commonly available from Apple Computer, International Business Machines and Compac Computer, a printer 604 of any suitable conventional design such as those commonly available from Hewlett-Packard Company and Canon, and a card reader/writer 606 adapted to receive a smart card 608. Both the printer 604 and the reader/writer 606 are in operative communication with the computer 602 which contains suitable programming to perform the accounting function and dispense postage. Thus, the computer 602 and printer 604 serve as the terminal and value dispensing device, respectively. The printer 604 is used to print postal indicia on an envelope (not shown) as evidence of postage. Here, the smart card 608 operates as described above and the accounting information is redundantly stored in the computer 602. The remaining features and operations of the system 600 remain substantially as described above.

Those skilled in the art will recognize that the reader/writer 606 could be incorporated into the housing of the computer 602. Furthermore, a floppy disk, optical disk, or the like, could be substituted for the smart card 608. All that would be required is an appropriate reader/writer which corresponds to the portable data carrier medium.

Many features of the preferred embodiments represent design choices selected to best exploit the inventive concept for as implemented in a postage dispensing system. However, the present invention is applicable to other value dispensing systems. Additional advantages and modifications other than those discussed above will readily occur to those skilled in the art. Therefore, the invention in its broader aspects is not limited to the specific details of the preferred embodiment. Accordingly, various modifications may be made without departing from the spirit of the general inventive concept as defined by the appended claims and their equivalents.

What is claimed is:

1. A value dispensing system, comprising:

a portable data carrier including a memory having stored therein accounting information indicative of an amount of value available for dispensing; and a terminal including a memory and means for dispensing value, the terminal adapted to receive the portable data carrier and process a transaction which dispenses a given value in response to a digital token generated by the portable data carrier using a first cryptographic key; and wherein, for the value dispensed, a transaction record is created having a secret portion which is indicative of the amount of value available for dispensing on the portable data carrier, the secret portion of the transaction record is encrypted using a second cryptographic key derived from the first cryptographic key, and the transaction record is stored in the terminal memory.

2. The system according to claim 1, wherein:

the transaction record stored in the terminal memory further includes a clear portion having data therein;

and further comprising:

a portable data carrier issuing authority;

wherein, if the portable data carrier becomes damaged such that the accounting information stored in the portable data carrier memory is lost, then the authority: (1) retrieves the transaction record from the terminal memory, (2) uses the data in the clear portion to derive the second cryptographic key, and (3) decrypts the secret portion using the second cryptographic key to determine the amount of value available for dispensing for the damaged portable data carrier.

3. The system according to claim 1, wherein:

the second cryptographic key is derived from the first cryptographic key using variable data.

4. The system according to claim 3, wherein:

the transaction record stored in the terminal memory further includes a clear portion having the variable data therein.

5. The system according to claim 4, further comprising:

a portable data carrier issuing authority;

wherein, if the portable data carrier becomes damaged such that the accounting information stored in the portable data carrier memory is lost, then the authority: (1) retrieves the transaction record from the terminal memory, (2) uses the variable data in the clear portion to derive the second cryptographic key, and (3) decrypts the secret portion using the second cryptographic key to determine the amount of value available for dispensing for the damaged portable data carrier.

6. The system according to claim 5, wherein:

the variable data is an indication of the time that the value was dispensed;

the terminal is a postage evidencing device;

the terminal memory is a non-volatile memory;

the portable data carrier is a smart card; and the value dispensed is postage.

7. The system according to claim 6, wherein:

the transaction record further includes a first check number located in the clear portion and a second check number different from the first check number located in the secret portion, the first check number and the second check number have a known corresponding relationship to each other;

the authority compares the first check number to the second check number after decrypting the transaction record to validate the decryption; and if the decryption is valid, then the authority issues a credit for the damaged portable data carrier.

8. The system according to claim 7, wherein:

the first check number is a palindrome of the second check number.

9. The system according to claim 8, wherein:

the randomly generated data is an indication of the time that the value was dispensed;

the terminal is a postage evidencing device;

the terminal memory is a non-volatile memory;

the portable data carrier is a smart card; and the value dispensed is postage.

10. A method of storing accounting information in a value dispensing system including a portable data carrier and a terminal, the terminal including a memory and means for dispensing value and adapted to receive the portable data carrier, the portable data carrier including a memory having stored therein accounting information indicative of an amount of value available for dispensing, comprising the steps of:

(a) generating a digital token indicative of a given using a first cryptographic key;

(b) dispensing the given value;

(c) generating a second cryptographic key derived from the first cryptographic key;

(d) creating a transaction record having a secret portion using the second cryptographic key which is indicative of the amount of value available for dispensing on the portable data carrier; and (e) storing the transaction record in the terminal memory.

11. The method according to claim 10, wherein step(c) further includes the step of:

(f) using variable data to derive the second cryptographic key from the first cryptographic key.

12. The method according to claim 11, wherein the transaction record further includes a clear portion and further comprising the step(s) of:

if the portable data carrier becomes damaged such that the accounting information stored in the portable data carrier memory is lost, then:

(g) retrieving the transaction record from the terminal memory;

(h) using the variable data in the clear portion to derive the second cryptographic key; and (i) decrypting the secret portion using the second cryptographic key to determine the amount of value available for dispensing for the damaged portable data carrier.

13. The method according to claim 12, wherein the transaction record further includes a first check number located in the clear portion and a second check number different from the first check number located in the secret portion, the first check number and the second check number having a known corresponding relationship to each other, and further comprising the steps of:

(d) decrypting the second check number using the second cryptographic key;

(e) comparing the first check number to the second check number to determine if the decryption of the secret portion is valid;

(f) if the decryption of the secret portion is valid, then issuing a credit for the damaged portable data carrier.

* * * * *